Dec. 21, 1943.  E. M. BUTLER  2,337,151
ELECTROLYTIC WATER CORRECTION DEVICE
Filed June 7, 1940   2 Sheets-Sheet 2
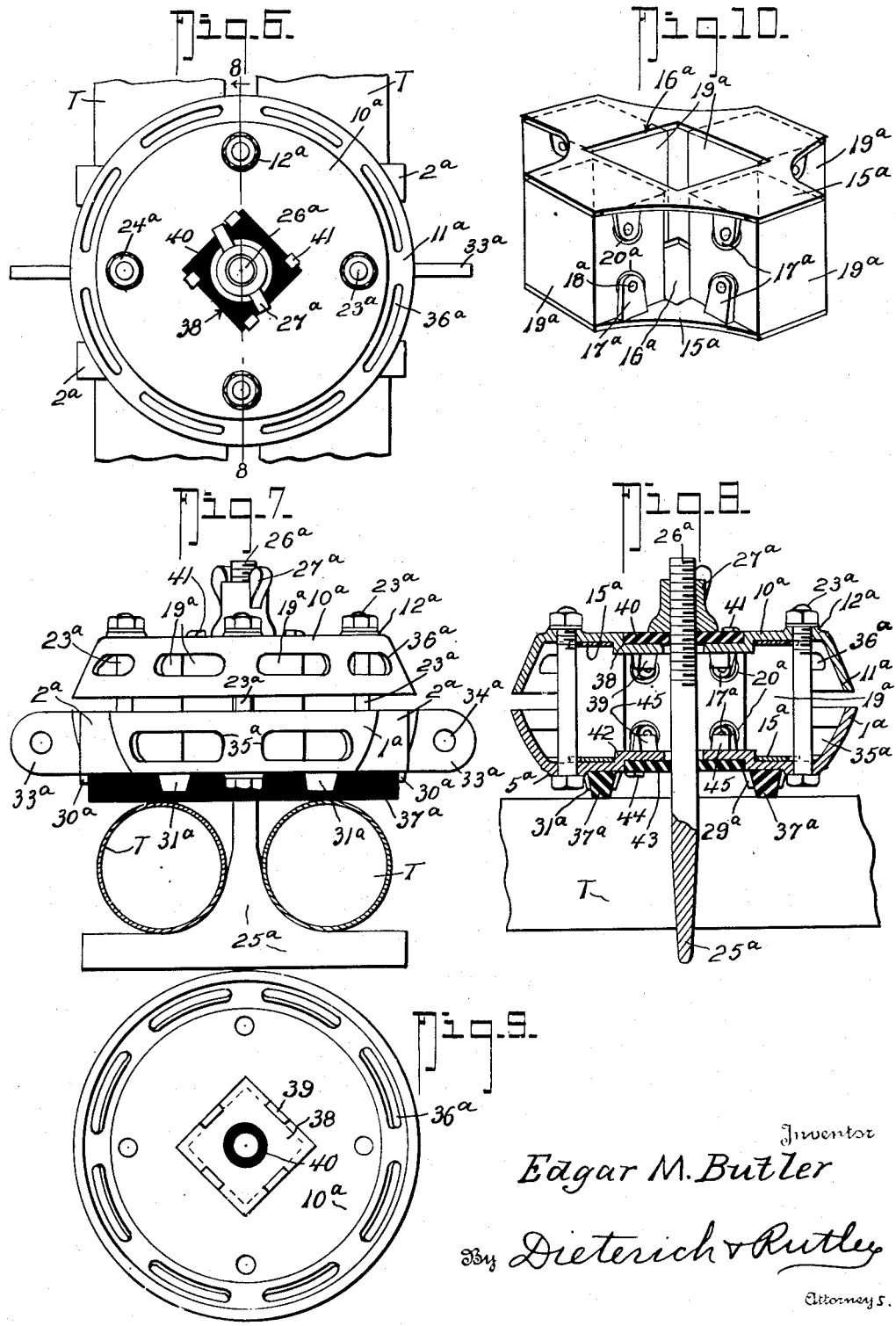
Inventor
Edgar M. Butler
By Dieterich & Rutley
Attorneys.

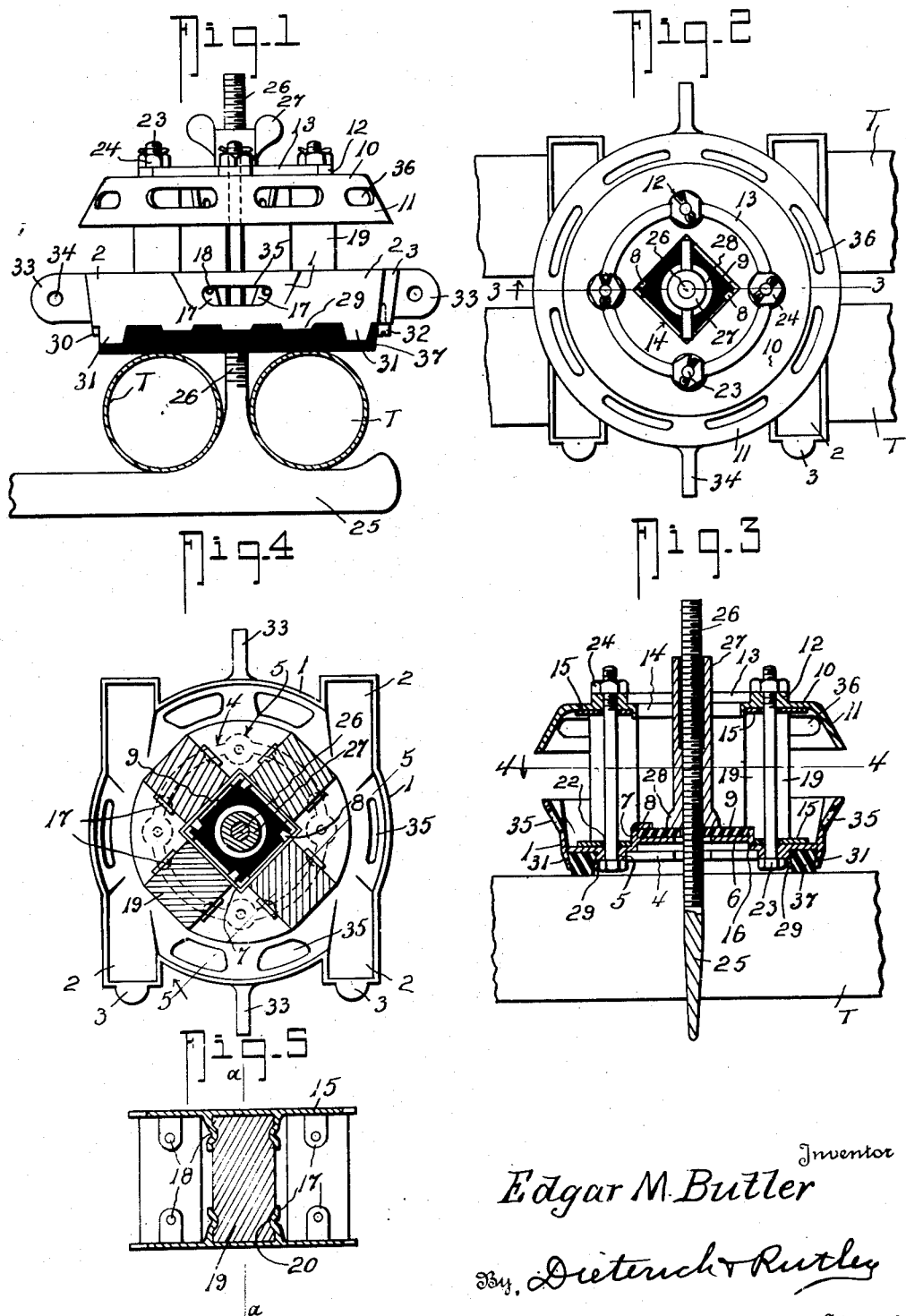

Patented Dec. 21, 1943

2,337,151

UNITED STATES PATENT OFFICE 2,337,151

ELECTROLYTIC WATER CORRECTION DEVICE

Edgar M. Butler, New Orleans, La.

Application June 7, 1940, Serial No. 339,385

9 Claims. (Cl. 204—248)

My invention which, in general, applies to the art of water purification, specifically relates to a certain new, useful and improved electrolytic unit for converting soluble mineral matter, found in most water, into small solid particles.

Generically the present invention has for an object to provide a device that is self-energizing when submerged in water which may be subject to a differential of temperatures within the vessel or circulating system, which device is composed of a single or multiple of positive elements, and a single or multiple of negative elements, so constructed and designed as to operate with the greatest efficiency possible.

More specifically, the present invention has for its objects: to provide a device composed of positive and negative parts so cooperatively arranged and designed that the negative element will be consumed as nearly uniformly as possible; to provide a device in which the negative element is made of a hard compact mass having a minimum porosity (as hard drawn or rolled metal); to provide a device in which the negative element is composed of a plurality of sections connected together in multiple by intensifier plates or rings composed of the same metal as the positive element, the plates or rings and the negative elements being secured together as a unit under high pressure to insure and maintain a good physical as well as electrical contact between the adjacent surfaces of the elements and the plates or rings with which they are associated; to provide further for the maintaining of good electrical contact between the positive element of the device and the plates or rings of the negative element; to provide a device with ample means for insulating it from the metal parts of the cell (boiler, vessel or circulating system) in which it is used, thus confining all electrolytic energies within the unit and thus intensifying the self-energizing ability of the unit; to provide a device in which the effective voltage may be increased as may be required to energize the water, depending on its volume within a given cell (boiler, vessel, circulating system, etc.); to provide a device whose case has ample openings to prevent accumulation of scale, residue solidified mineral salts, etc., from settling within the unit and thus diminish its efficiency; and to provide an insulated clamp device for fastening the unit in position where the vessel is subject to movement.

Other objects will in part be obvious and in part be pointed out hereinafter.

To the attainment of the aforesaid objects and ends the invention still further resides in the novel details of construction, combination and arrangement of parts, all of which will be first fully described in the following detailed description, and then be particularly pointed out in the appended claims, reference being had to the accompanying drawings, in which—

Fig. 1 is an elevation of a preferred embodiment of the present invention.

Fig. 2 is a top plan view of the same.

Fig. 3 is a vertical section on the line 3—3 of Fig. 2.

Fig. 4 is a horizontal section on the line 4—4 of Fig. 3.

Fig. 5 is a detailed section of the negative unit, taken on the line 5—5 of Fig. 4.

Fig. 6 is a top plan view of another embodiment of my invention.

Fig. 7 is an elevation of the same.

Fig. 8 is a vertical section on the line 8—8 of Fig. 6.

Fig. 9 is an inverted plan view of the upper half of the case (positive element).

Fig. 10 is a detail perspective view of one of the negative units.

In the drawings, in which like letters and numerals of reference indicate like parts in all the figures, I represents the lower half and II the upper half of the case which constitutes the positive element of the device and is preferably composed of copper.

The lower half I of the case has parallel extensions 2 arranged in pairs and providing, on their under side, seats for the parallel bars 37 of insulation (stone or suitable composition which will not deteriorate substantially in service). These bars in the first form of the invention are replaceably held by short and long side lugs 29 and 31, end lugs 30, and removable abutment or stop screws 32 in tapped bosses 3 (see Figs. 1 and 3). The lower half I of the case has as large openings 35 as possible in its annular wall, and is spaced from the upper half 10, 11 to provide ample water circulating openings.

The bottom of the lower half I of the case is countersunk to provide a web 6 from the margin of which a flange 7 projects upwardly and forms a pocket for the reception of a block 9 of suitable insulation. The pocket and block are preferably of angular outline so as to hold the block against turning in its pocket or seat. The flange 7 has extension lugs 8 which, after the block 9 is in place, are bent over to secure the block. The block 9 has a hole to pass the bolt 26 of the clamp 25, while the web 6 has a larger hole to prevent its contacting the bolt 26.

The bottom of the lower half of the case has bosses 5 bored to pass the bolts 23 which hold the case halves and the negative unit assembled, the bosses 5 being connected by a reinforcing rib 4.

The upper half 10 of the case has its annular wall or rim 11 provided with large water circulating openings 36 similar to the openings 35 in the lower half.

Bosses 12 apertured to permit the bolts 23 to pass, and a strengthening rib 13 are also provided on the top of the upper half of the case. The bolts 23 have their nuts 24 secured by cotter pins 21. The upper half of the case has an opening surrounded by an inwardly projecting flange 14. The flanges 7 and 14 are preferably alike in outline and position relative to the axis of bolts 26, so as to fit within the openings 16 in the end plate or rings 15 of the negative unit.

The negative unit comprises upper and lower end plates or rings 15, 15, having suitably spaced groups of malleable fingers 17 to receive between pairs of them the negative electrode blocks 19. The blocks 19 have depressions 20 into which portions 18 of the fingers are driven to lock the plates or rings 15 securely to the blocks 19 with their ends in tight contact with the plates or rings.

In practice, the blocks 19 are formed of hard drawn or rolled metal, cut to size, with their end faces squared to afford good physical and electrical contact with the end plates or rings 15. Before forcing the fingers 17 into tight gripping action with the blocks 19 (by punch driving the portions 18 into recesses 20) the parts are held tightly together by applying pressure (preferably high pressure) in the directions of the arrows a in Fig. 5 and while maintaining such pressure the fingers 17 are punched or driven into the recesses 20. In this way practically a continuous surface contact is had between the ends of the blocks 19 and the plates or rings 15 to prevent water from getting in between such contacting surfaces, as I have found that unless water is excluded from between the ends of the blocks and the plates or rings 15 the life and effectiveness of the negative electrodes is reduced.

In the form shown on sheet one of the drawings, the plates or rings 15 have holes 22 for the bolts 23 to pass.

In order to anchor the device to the boiler tubes T I provide a T-clamp 25 which fits under the tubes and has a bolt portion 26 that passes through the insulating block 9. A long winged nut 27 having an enlarged base 28 which rests on block 9 (Fig. 3) serves to draw the clamp and insulating bars 37 tight to the boiler tubes T. In this way consumption of the electrodes and consequent loosening of the upper half of the case will not cause a loosening or detachment of the device from the tubes T.

It should be understood that in assembling the positive and negative units the bolts 23 are drawn up as tightly as possible to get as good contact between the case halves and plates or rings 15 as can be had. However, entry of water between the case and plates or rings 15 is of no consequence when the plates or rings are made of the same material as the case.

The negative electrode elements 19 are made of hard substance (such as zinc, bismuth, lead, tin, aluminum, antimony, alone or in whatever combination with one another—one or more—and/or with mercury, may be found most effective under varying conditions of water, steam pressure, heat transfer, etc.). I have found, however, that it is essential, in order to produce a commercially practical and successful device of this character, that the negative element have the least possible porosity, i. e., it should be of hard drawn or rolled metal preferably zinc of as high a degree of purity as possible.

Referring now to sheet two (Figs. 6 to 10 inclusive), those parts which are analogous to like parts in the first form (Figs. 1 to 5) bear the same reference number plus the index letter a; so a repetition of their description here is thought to be superfluous. This embodiment differs from that of the first embodiment in that both halves of the case have inwardly sunk portions 38, 42 apertured to clear the clamp bolt 26ª and to receive insulating blocks 40 and 43, respectively, which have holes to fit the bolt 26ª, the nut 27ª bearing on the upper block 40 instead of the lower block 43. Lugs 41 and 44 secure the blocks 40 and 43, respectively, in place. Further, the inwardly projected insulator block holding portions 38, 42 are provided with guide lugs 39 and 45 respectively, over which and over the portions 38, 42 the negative unit (Fig. 10) fits.

The devices may be provided with coupling lugs 33, 33ª, apertured at 34, 34ª, so that two or more may be linked together if desired.

By making the positive and negative elements as nearly 100% opposite in electrical potentiality as possible, adjusting the metallic composition of the negative element properly, and by making a definite electrical bond between the two, the very low voltage created may be proportionately effectively increased by increasing the number of negative elements and corresponding bonds between the negative and positive elements in a unit.

From the foregoing it will be seen that I have developed a self-energizing electrical unit in which, by increasing the number of negative blocks in a unit, the voltage may be increased as may be required to energize the water (electrolyte), depending upon its volume within a given cell (boiler, vessel, circulating system, etc.).

As the generation of energy must be at the expense of some element, it is found, in applicant's device, that the negative element will decompose or disintegrate in quantity, depending upon the amount of energy produced, the quality of water (electrolyte) and the degree of heat to which the unit is subject, and it has been found that disintegration, to a great degree, is in the form of metallic oxide which coats the surface of the ferrous metal parts of the cell (boiler, vessel, etc.), preventing most forms of corrosion.

From the foregoing description, taken in connection with the accompanying drawings, it is thought the construction, operation and advantages of the invention will be clear to those skilled in the art.

What I claim is:

1. In a self-energizing electrolytic water correction device of the character described, a positive element comprising an upper and a lower cup-like member, the lower member having a flange to embrace a space, an insulation block held in said space, said block having a bolt receiving hole and said lower member having a bolt-clearing and passing hole, insulating bars secured to the under side of said lower member, a negative element unit located between and secured to said upper and lower members, means including a bolt passing through said holes, and a nut on said bolt to engage said insulation block and means on said bolt to engage beneath the tubes of a boiler on which tubes the device may be set to secure the device on boiler tubes.

2. In a self-energizing electrolytic water correction device, a negative element comprising a plurality of metal blocks spaced apart and held in parallel relation, end plates having block engaging fingers, against which plates the ends of the blocks lie between pairs of said fingers, and means by which said fingers securely hold said blocks to said end plates.

3. In a self-energizing electrolytic water correction device, a negative element comprising a plurality of metal blocks spaced apart and held in parallel relation, end plates having block engaging fingers, against which plates the ends of the blocks lie between pairs of said fingers, and means by which said fingers securely hold said blocks to said end plates, said means comprising recesses in the sides of the blocks into which portions of said fingers are tightly fitted.

4. In a self-energizing electrolytic water correction device, in combination, upper and lower cup-like case halves each having bolt holes and a rim the rims being directed toward each other but spaced apart to provide water circulating openings and together constituting a positive-element case, each case half having an axially disposed inwardly extended flange-like portion; a negative unit composed of two end plates of positive material apertured to fit over said flange-like portions and negative blocks spaced apart with their ends secured to said end plates respectively the end faces of said negative blocks lying in surface contact with said end plates respectively and said end plates lying in surface contact with said case halves respectively; and bolts with nuts passed through said bolt holes to secure said halves and said negative unit together.

5. In a self-energizing electrolytic water correction device, in combination, upper and lower cup-like case halves each having bolt holes and a rim and together constituting a positive-element case, each having an inwardly extended flange-like portion and each having an opening within that portion which is within the bounds of the flanges; a negative unit composed of two end plates of positive material apertured to fit over said flange-like portions, negative blocks spaced apart with their ends secured to said end plates respectively; bolts with nuts passed through said bolt holes to secure said halves and said negative unit together; insulators on the lower half of the case by which the case may rest on boiler pipes; insulation blocks secured within the confines of the lower and upper flanges and apertured; and a clamp bolt passing through said blocks and having means for securing the device to boiler tubes out of electrical contact with the same and for applying pressures tending to hold said case halves and said negative unit together in mechanical and electrical contact with one another.

6. In a self-energizing electrolytic water correction device, a negative replacement element comprising a plurality of hardened metal blocks spaced apart and held in parallel relation, end plates having block engaging fingers, against which plates the ends of the blocks lie between pairs of said fingers, and means by which said fingers securely hold said blocks to said end plates.

7. A self-energizing electrolytic water correction device, which includes two spaced apart cup-like positive elements, a negative element located between said positive elements, means for mechanically securing said positive and negative elements tightly together with the opposite ends of the negative element in good electrical contact with the positive elements respectively, said negative element comprising a unitary structure composed of a pair of spaced end plates which lie against the inner faces of said cup-like positive elements, and a plurality of blocks of suitable metal separately secured to and between said end plates in good electrical contact therewith.

8. In a self-energizing electrolytic water correction device, upper and lower positive elements, a negative element located between said positive elements, insulating bars carried by said lower positive element on its under side and adapted to rest crosswise on a pair of boiler tubes in the boiler in which the device is to be used, a T-clamp having a cross-bar to lie under said pair of boiler tubes and having a bolt to pass between the tubes of a pair and through said upper and lower positive elements, and means cooperating with said bolt for securing the device firmly to said pair of tubes.

9. In a self-energizing electrolytic water correction device, upper and lower positive elements, a negative element located between said positive elements, insulating bars carried by said lower positive element on its under side and adapted to rest crosswise on a pair of boiler tubes in the boiler in which the device is to be used, a T-clamp having a cross-bar to lie under said pair of boiler tubes and having a bolt to pass between the tubes of a pair and through said upper and lower positive elements, and means cooperating with said bolt for securing the device firmly to said pair of tubes, and at the same time drawing said upper and lower positive elements and said negative element into good electrical and mechanical engagement with one another.

EDGAR M. BUTLER.